United States Patent
Pettovello et al.

(10) Patent No.: US 10,382,348 B2
(45) Date of Patent: Aug. 13, 2019

(54) TIME ORDERED MESSAGE SERIALIZER

(71) Applicant: GENERAL MOTORS LLC, Detroit, MI (US)

(72) Inventors: Primo Mark Pettovello, Canton Township, MI (US); Charles A. Wiley, Austin, TX (US); Kenan G. Dalley, Gilbert, AZ (US)

(73) Assignee: General Motors LLC, Detroit, MI (US)

( * ) Notice: Subject to any disclaimer, the term of this patent is extended or adjusted under 35 U.S.C. 154(b) by 240 days.

(21) Appl. No.: 15/359,992

(22) Filed: Nov. 23, 2016

(65) Prior Publication Data

US 2018/0145920 A1    May 24, 2018

(51) Int. Cl.
*H04L 12/875* (2013.01)
*H04B 1/3822* (2015.01)
*H04L 12/865* (2013.01)

(52) U.S. Cl.
CPC ......... *H04L 47/562* (2013.01); *H04B 1/3822* (2013.01); *H04L 47/6275* (2013.01)

(58) Field of Classification Search
CPC .. H04B 1/3822; H04L 47/6275; H04L 47/562
See application file for complete search history.

(56) References Cited

U.S. PATENT DOCUMENTS

| | | | |
|---|---|---|---|
| 9,537,914 B1* | 1/2017 | Dong | H04L 65/4069 |
| 2012/0248261 A1* | 10/2012 | Nichter | B61L 15/0027 246/125 |
| 2014/0095445 A1* | 4/2014 | Deshmukh | G06F 17/30463 707/661 |
| 2014/0095791 A1* | 4/2014 | Bell, Jr. | G06F 12/084 711/122 |
| 2016/0092452 A1* | 3/2016 | Wang | G06K 9/00785 707/752 |
| 2017/0006135 A1* | 1/2017 | Siebel | H04L 67/02 |

* cited by examiner

*Primary Examiner* — Arvin Eskandarnia
*Assistant Examiner* — Juan C Turriate Gastulo
(74) *Attorney, Agent, or Firm* — Reising Ethington P.C.; James E Howard (57) ABSTRACT

A system and method for processing a plurality of vehicle messages, wherein the method comprises: receiving a plurality of vehicle messages from a plurality of vehicles; generating a key n-tuple including a key and a time indicator for each of the vehicle messages; storing each of the vehicle messages in a data structure that comprises a priority queue for each key; storing each of the key n-tuples in a timer queue; obtaining a key n-tuple from the timer queue; recalling a vehicle message from a corresponding priority queue; and sending the vehicle message to at least one of a plurality of compute nodes.

12 Claims, 3 Drawing Sheets

TIME ORDERED MESSAGE SERIALIZER

TECHNICAL FIELD

The invention relates to data processing and, more particularly, to processing messages received from a plurality of remote devices in a desired time-ordered fashion.

BACKGROUND

With a growing number of computers, data networks communicate an increasing amount of data. Many electronic devices now carry out network communications. For example, many vehicles now communicate information relating to the vehicle to a remote facility using available cellular network capabilities. This information may be stored, analyzed, and/or processed by the remote facility. Additionally, it may be desirable to generate and/or send a message in response to a message received from the vehicle.

In some instances, it is desirable to process messages in the order in which they were generated and/or sent. Recipients may not be able to process the messages based on the order of receipt at the remote facility since the messages may arrive in a different order than which they were sent and/or generated. For example, a message sent over a cellular network may be lost and need to be resent. Messages generated after the lost message may be received before the resent lost message. In another example, a first message may be sent via a first cell tower and a second message may be sent via a second cell tower. If the first cell tower experienced a heavy load at that time, while the second cell tower did not, the second message may arrive first. Processing messages based on when the remote facility received them may result in processing them out of an intended order. This problem is exacerbated when receiving a very large number of messages in a small window of time.

SUMMARY

According to an embodiment of the invention, there is provided a method for processing a plurality of vehicle messages, wherein the method comprises: receiving a plurality of vehicle messages from a plurality of vehicles; generating a key n-tuple including a key and a time indicator for each of the vehicle messages; storing each of the vehicle messages in a data structure that comprises a priority queue for each key; storing each of the key n-tuples in a timer queue; obtaining a key n-tuple from the timer queue; recalling a vehicle message from a corresponding priority queue; and sending the vehicle message to at least one of a plurality of compute nodes.

According to another embodiment of the invention, there is provided a method for processing a plurality of vehicle messages, wherein the method comprises: receiving a plurality of vehicle messages from one or more vehicles; storing a key-time pair including a key and a time indicator for each of the plurality of vehicle messages in a timer queue; storing each of the vehicle messages in a data structure that includes a priority queue for each key, and wherein each of the vehicle messages are stored in a priority queue that corresponds to the key that was generated for that vehicle message; receiving an indication that a compute node is available to process a vehicle message; recalling a next key-time pair from the timer queue; determining that a vehicle message with an associated key identical to the key of the next key-time pair is not presently being processed in at least one compute node; and dispatching the oldest vehicle message in the priority queue that corresponds to the key of the next key-time pair.

According to yet another embodiment of the invention, there is provided a method for processing a plurality of messages, comprising: receiving a plurality of time-sensitive messages from one or more remote devices; storing a key-time pair including a key and a time indicator for each of the plurality of messages in a timer queue; grouping messages with identical keys into the same time-sensitive set of messages; storing each of the messages in a data structure that includes a priority queue for each key, and wherein each of the messages are stored in a priority queue that corresponds to the key that was generated for that message; receiving an indication that processing of a message has been completed; recalling a next key-time pair from the timer queue; determining that a message with a key identical to the key of the next key-time pair is not presently being processed in at least one compute node; and dispatching the oldest message in the priority queue that corresponds to the key of the next key-time pair.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The system and methods described below enable a data network to communicate and process time-sensitive messages received from a plurality of remote devices. In one embodiment, a remote device may comprise a vehicle or a certain vehicle module. The data network processes the messages in a desired order as indicated by a time indicator included in the messages. As used herein, a time-sensitive message is processed according to a desired order as indicated by a corresponding time indicator. Also, as used herein, a time-sensitive set of messages comprises one or more time-sensitive messages in which a certain processing order is desired or defined. A message that is part of a time-sensitive set of messages is processed according to a specified order as indicated by the time indicators associated with those messages that comprise the time-sensitive set of messages. It may be desirable to process messages in the order in which they were generated and/or sent by a certain remote device or a certain process running on a certain remote device and, thus, such messages generated and/or sent by a certain remote device or a certain process may comprise a time-sensitive set of messages.

For each of the messages, a key n-tuple, such as a key-time pair, is included therein or generated based at least partly on information included in the message or obtained via processing of the message. A key n-tuple comprises a key and at least one other value, such as a timestamp, sequence number, other time indicator, or a combination thereof. For example, a key n-tuple may include a key and any of the following (1) timestamp; (2) sequence number (key-sequence pair); or (3) a timestamp and a sequence number (key-time-sequence triplet). A key-time pair, as used herein, comprises a key value and a time indicator. A key or key value may be a string of bits or characters that identify either a vehicle, a remote device, a certain process of a remote device or vehicle, and/or a time-sensitive set of messages.

As used herein, a time indicator is a value that indicates the desired chronological or successional order of which to process the message relative to one or more other messages that were generated and/or sent by the same remote module and/or that are part of the same time-sensitive set of messages. In some embodiments, the time indicator may be a time value, such as a timestamp, indicating when the message was sent and/or generated. In such embodiments, the messages may be processed in the order of the timestamps from least to most recent.

Alternatively, the timestamp may indicate a desired time in which to process the messages. In such embodiments, the time indicator may be an ordinal or sequence number indicating the desired order in which to process messages from the same vehicle, remote device, module or process of a remote device, or within the same time-sensitive set of messages. For example, a message having a corresponding time indicator of "1" will be processed before a message of the same remote device, module or process of a remote device, vehicle, or time-sensitive set of messages having a corresponding time indicator of "2." In some embodiments, a key n-tuple may include a key, timestamp, and a sequence number and, in some cases, the sequence number may take precedent over the timestamp for purposes of the processing order of the messages. This may be the case if the timestamp reflects the time the message was generated or sent from a device.

When a remote facility receives a plurality of messages, the remote facility may pass the messages to a time serializer. The time serializer, as used herein, may be one or more processes that function to process the received messages in a desired order as indicated by a time indicator included in or derived from each message. In one embodiment, the time serializer may generate a key n-tuple, such as a key-time pair, for each of the messages, store each of the messages in chronological order in a corresponding priority queue, and store the key n-tuple in a timer queue. Generally, the time serializer may, upon receiving an indication that a message is finished being processed, recall the next key n-tuple from the timer queue and, subsequently, pass the next message from the corresponding priority queue to the compute node that recently finished processing a message.

Figure 1:
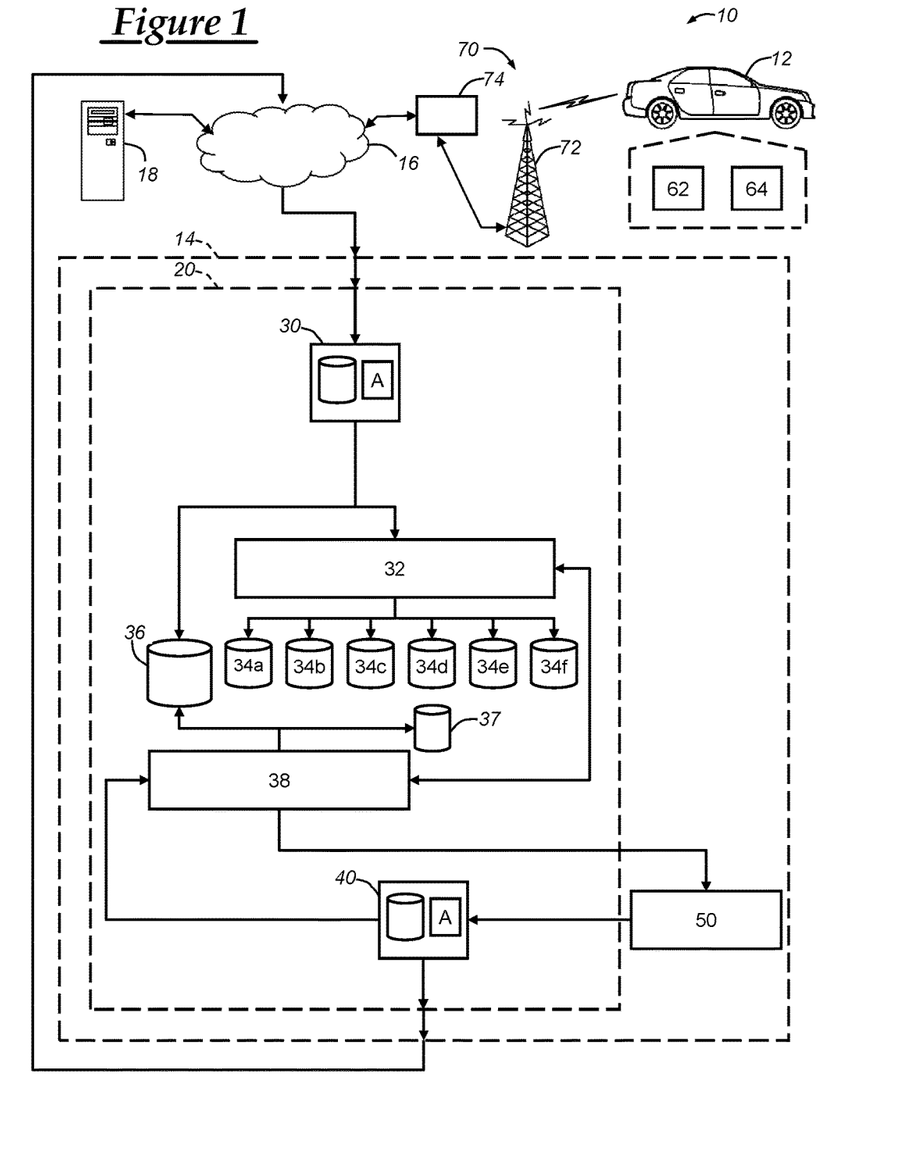
FIG. 1 is a block diagram depicting an embodiment of a communications system and a time serializer that is capable of utilizing the method disclosed herein.

Referring now to FIG. 1, there is shown an operating environment that comprises a communications system 10 and that can be used to implement the method disclosed herein. Communications system 10 generally includes a vehicle 12, one or more wireless carrier systems 70, a land communications network 16, a computer 18, and a remote server cluster 14. It should be understood that the disclosed method can be used with any number of different systems and is not specifically limited to the operating environment shown here. Also, the architecture, construction, setup, and operation of the system 10, namely the remote server cluster 14, and its individual components are generally known in the art. Thus, the following paragraphs simply provide a brief overview of one such communications system 10 and remote server cluster 14; however, other systems not shown here could employ the disclosed method as well.

The remote server cluster 14 is a collection of servers or computers that are configured such that they include a time serializer 20, compute server running a plurality of compute processes 50 (only one shown), and, potentially, numerous database systems, computing equipment, and input/output components. Although the compute server is not explicitly shown, the compute server may comprise numerous compute nodes or computing devices. In some embodiments, the compute nodes or computing devices may each include a time serializer and/or one or more compute processes. It should be appreciated that remote server cluster 14 may be located at a remote data facility. Moreover, in some embodiments, remote server cluster 14 may be arranged as a hyper-scale grid or a hyper-scale compute cluster.

The time serializer 20 generally includes an input/receiving process 30, a dispatcher process 38, and an output process 40. The time serializer is shown to also include a shared hash map 32 with priority queues 34a-f, a timer queue 36, and an in-flight table 37. However, in some embodiments, these components may be separate from time serializer 20, as will be discussed further below. Remote server cluster 14 receives messages from one or more devices or components of communications system 10 and, in one embodiment, may use shard routers to route the incoming messages to one or more compute nodes or servers, such as input/receiving process 30.

Although the illustrated embodiment depicts a single time serializer 20, there may be multiple time serializers operating at remote server cluster 14. Additionally, both the time serializer 20 and the compute process 50 may run on the same or different compute nodes. In one embodiment, the remote server cluster 14 comprises numerous compute nodes that include a time serializer. One or more routers (not shown) may then shard the messages to each time serializer on each of the compute nodes. The one or more routers may be configured in a peer-to-peer (P2P) arrangement. Or, there may be a single head-node router that shards the messages to the time serializers.

The input/receiving process 30 receives the time-sensitive messages from the plurality of remote devices and, in some embodiments, places the messages in an input queue. The receiving process 30 may merely comprise a set of instructions that run on a computing device, such as a server, or may comprise a set of specific hardware and/or software components, as is shown in FIG. 1 with a database (shown as a cylinder) or other storage and a computer application (A), which may comprise a set of computer instructions. Similarly, dispatcher 38 and output process 40 may comprise the same or different components, devices, and/or modules as receiving process 30 and, as will be described in greater detail below, different configurations, components, and/or devices may be desirable for implementing the differing features of the processes 30, 38, and 40. In addition to the time serializer 20 and the compute process 50, the remote server cluster 14 may include a number of other components. Such components may include a load balancer that directs messages to certain servers as to obviate a disproportionally heavy load on any one server or input/output queues between any one or more separate processes.

Shared hash map 32 is a data structure that stores a plurality of priority queues 34. The remote cluster server 14 may include a shared hash map manager that manages the hash map, which may, in one embodiment, coordinate the commitment of changes to the hash map 32. Generally, there is a one-to-one relationship of priority queues to key values; however, other relationships with different cardinalities may be used. In other embodiments, structure 32 may be a different type of data structure instead of a hash map. Additionally, the priority queues may be another type of queue, or they may be lists, heaps, stacks, or database tables. In another embodiment, the hash map 32 is "shared," meaning that many different processes, servers, or other systems may access it either directly or via a shared hash map manager. In one embodiment, the hash map may be partitioned into multiple pieces, but would still be considered a shared hash map in its entirety. In some embodiments, the shared hash map 32 may be stored on one or more memory mediums and/or databases.

The messages received at remote server cluster 14 or time serializer 20 are generally stored in a corresponding priority queue. The corresponding priority queue for a given message is the priority queue 34 in shared hash map 32 that corresponds to the time-sensitive set of messages to which the message belongs. For example, a time-sensitive set of messages may be generated and/or set by a particular remote device or process thereof, such as vehicle process 62. Upon receipt of each of the messages comprising the set, the messages may be stored in a priority queue corresponding to that process 62, which may be identified according to a VIN and ProcessID combination. The ProcessID may identify a process that is configured to run on a plurality of vehicles. In other embodiments, a process 62 may generate multiple time-sensitive sets of messages and, accordingly, a priority queue for each of the multiple time-sensitive sets may be created and maintained. In some embodiments, the key that is generated as part of the key-time pair may be based on this combination. Although there are only eight (8) priority queues 34a-f shown, there may be any number of priority queues such that there is a priority queue for each time-sensitive set of messages. In addition, as new messages comprising a new time-sensitive set are received at cluster 14, the new set of messages may accounted for by time serializer 20 and/or data structure 32, which will create a new priority queue for that time-sensitive set.

Compute process 50 represents one or more processes that may be carried out on one or more processors that operate to process the received messages. In some embodiments, the processing carried out by compute process 50 may be time sensitive such that the messages must be processed in a certain time order. Thus, as will be demonstrated below, the dispatcher 38 passes messages from the priority queues 34 to the compute process 50. The processes may be carried out on numerous different servers, processors, and/or cores, such that numerous messages may be processed in a parallel fashion. For example, compute process 50 may include multiple processors on multiple different computers. Or, in another embodiment, there may be a single compute processor. The dispatcher may also analyze the type of message and/or attributes of the message to determine which compute processor to direct the message to. For example, a vehicle 12 may send numerous messages pertaining to different vehicle devices, such as an infotainment unit and an autonomous engine control unit, to remote server cluster 14. Thus, based on which device of the vehicle generated and/or sent the message or based on the ProcessID of the process that generated and/or sent the message, the message may be sent to a different compute processor that is configured to carry out specific instructions on that message. For example, a message comprising GPS location information for an autonomous vehicle may be sent to a GPS/GNSS corrections compute processor, while a message comprising diagnostic codes may be sent to a separate compute processor that handles the diagnostic codes.

The in-flight data structure 37 may be any type of data structure or collection of data that stores one or more keys, such as those keys stored in the timer queue 36. The in-flight data structure can, in some embodiments, conveniently provide a list of keys corresponding to one or more messages which are presently being processed by a compute process 50. In one embodiment, the in-flight data structure is a table that stores one or more keys and, is referred to an "in-flight table" herein. The in-flight table 37 may be stored in RAM, a non-volatile memory medium, etc. In one embodiment, the in-flight table 37 is stored in the RAM allocated to the dispatcher 38.

Time serializer 20 may also include a lock manager (not shown). The lock manager creates a backup or copy of certain elements of the time serializer 20 or cluster 14. In one embodiment, the lock manager creates a backup of data structure 32 (which includes priority queues 34), the in-flight table 37, and timer queue 36. The lock manager may run a backup process at the occurrence of a time interval or may run a backup process upon the triggering of an event, such as the modification of data in the timer queue 36.

Wireless carrier system 70 is preferably a cellular telephone system that includes a plurality of cell towers 72 (only one shown), one or more mobile switching centers (MSCs) 74, as well as any other networking components required to connect wireless carrier system 70 with land network 16. Each cell tower 72 includes sending and receiving antennas and a base station, with the base stations from different cell towers being connected to the MSC 74 either directly or via intermediary equipment such as a base station controller. Cellular system 70 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 70. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Land network 16 may be a conventional land-based telecommunications network that is connected to one or more landline telephones and connects wireless carrier system 70 to remote server cluster 14. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote server cluster 14 need not be connected via land network 16, but could include wireless telephony equipment so that it can communicate directly with a wireless network, such as wireless carrier system 70.

Computers 18 (only one shown) can be some of a number of computers accessible via a private or public network such as the Internet. Each computer 18 may send a plurality of messages to remote server cluster 14 and, in some embodiments, the plurality of messages may comprise one or more time-sensitive sets of messages. As such, the key for a given time-sensitive set may be a media access control (MAC) address, provided the computer 18 only sends messages comprising a single time-sensitive set, or a combination of a MAC address and a ProcessID in the case where numerous processes each send messages comprising a time-sensitive set. Each such computer 18 can be used for one or more purposes, such as a web server accessible by the remote server cluster 14. Other such accessible computers 18 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12, remote server cluster 14, or both. A computer 18 can also be used for providing Internet connectivity such as domain name system (DNS) services or as a network address server that uses dynamic host configuration protocol (DHCP) or other suitable protocol to assign an internet protocol (IP) address to the vehicle 12.

Vehicle 12 (only one shown) is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 12 is shown to include two processes 62 and 64. Each process 62,64 may be part of a different module located at the vehicle or may be different processes that are part of the same vehicle module. Vehicle 12 is shown as being capable of communicating with remote server cluster 14 via wireless carrier system 70 and land network 16. In one exemplary embodiment, the method described below is capable of processing vehicle messages received from processes 62,64 of a plurality of vehicles 12.

Figure 2:
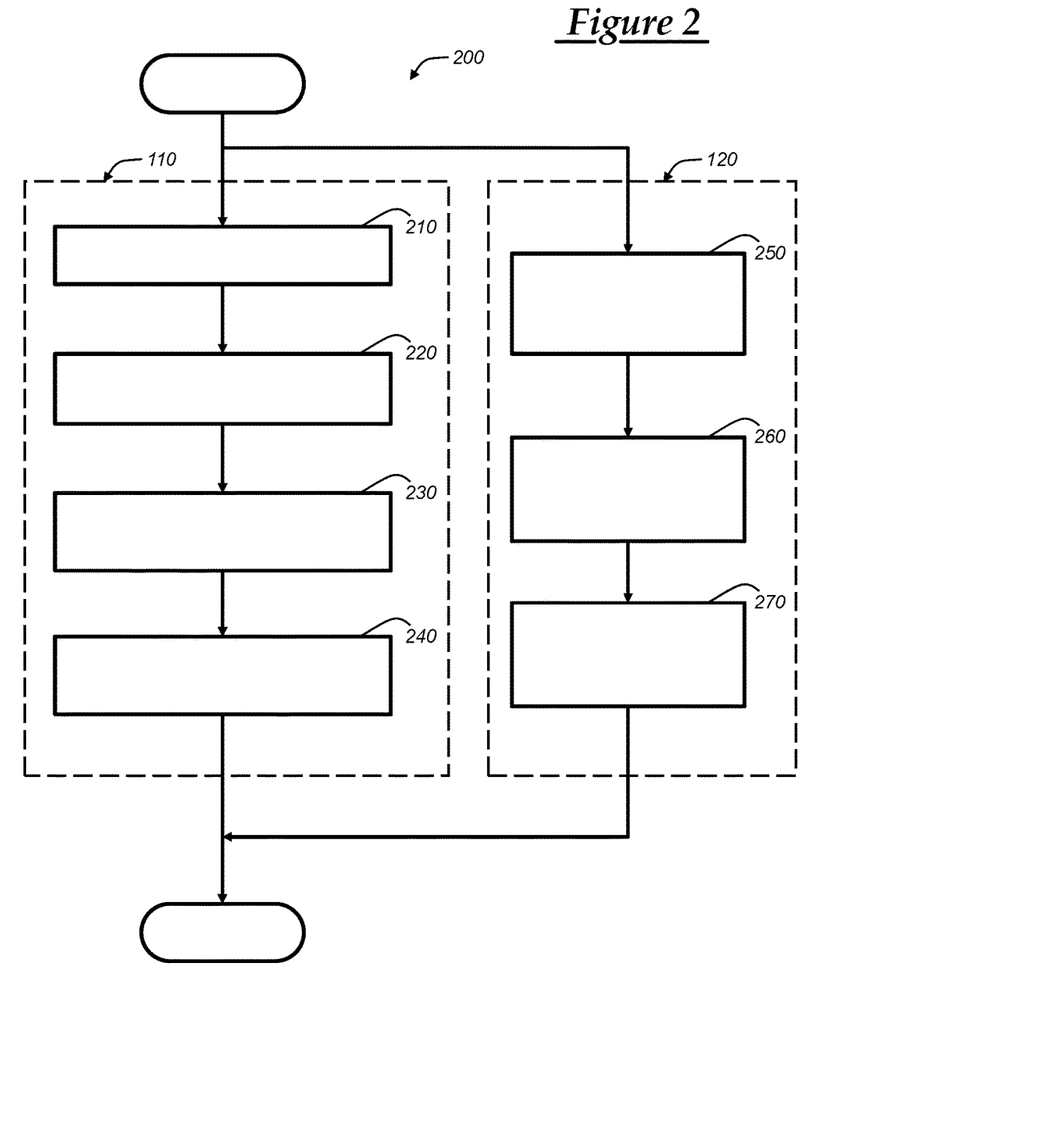
FIG. 2 is a flowchart illustrating a method for processing a plurality of time-sensitive messages.

With reference to FIG. 2, there is shown an embodiment of a method 200 for processing a plurality of time-sensitive messages. The method 200, as shown in FIG. 2, contains two sub-methods: a receiving and storage process 110 and a message retrieval and computing process 120. These two processes may run in a serial or parallel fashion and in the same or different threads, which may be configured to run on the same or different servers, processors, cores, and/or computers; however, in a preferred embodiment, the processes run in a parallel fashion on different threads or processors. In many embodiments, the receiving and storage process 110 generally comprises four steps: receiving time-sensitive messages from a remote device or system, such as a vehicle (step 210); generating a key-time pair for each of the messages received (step 220); storing the key-time pair in a timer queue (step 230); and storing the messages in the corresponding priority queue (step 240). Although the process 110 operates to receive and store a plurality of messages, the process 110 will be described with respect to the receiving and storing of a single message. The process 110 may be carried out for each message received at time serializer 20, and many instances of process 110 may run in unison on multiple different threads, computers, processors, and/or cores.

The receiving and storage process 110 begins at step 210 where the process 110 receives a message from a vehicle process, such as process 62. A message may be generated at a vehicle 12 and then sent via a cellular carrier network 70 and land network 16 to server cluster 14. The message may be generated and/or sent by the vehicle at or around the same time as multiple other messages. In another embodiment, a message may be sent from another remote system or device, such as computer 18, to cluster 14 via land network 16. In yet another embodiment, a message may be sent from an intra-network device at server cluster 14 to input/receiving process 30 in time serializer 20. Such an intra-network device may be any device that is co-located at server cluster 14, such as from compute process 50 or output process 40. In any event, the message is received at an input/receiving process 30.

As used herein, a message is information and/or data that is encoded such that it may be transmitted via data communications. For example, a message may comprise a string, an array, or a collection of bits. In some embodiments, the message may comprise a header and a payload, wherein the payload comprises the data that is to be processed by a compute node 50. The header may be metadata, such as information pertaining to the device(s), module(s), or process(es) that generated and/or sent the message. The header may also include other information such as a recipient compute node 50, data pertaining to a key-time pair, a recipient of a response message that is to be generated and sent by cluster 14, a specific cluster 14's address, and/or other information, as will be appreciated by those skilled in the relevant art.

In one embodiment, the message may comprise a key-time pair, including a key value and a time indicator. One such example of a time indicator is a timestamp that may indicate the absolute time the message was generated and/or sent. In another example, the time indicator may be an ordinal or sequence number representing the order in which the message was generated and/or sent with respect to other messages that are part of the same time-sensitive set of messages. In yet another example, the time indicator may be an ordinal or sequence number representing the order in which to process the message relative to the processing of other messages that are part of the same time-sensitive set of messages. As one skilled in the art will appreciate, the message may be encrypted before the message is communicated over communications system 10 and, subsequently, decrypted at the remote server cluster 14 or other appropriate location. After the message is received, the method continues to step 220.

In step 220, a key-time pair is generated or obtained for the received message. A key-time pair comprises a key and a time indicator. In one embodiment, the time indicator is a timestamp of when the message was generated. In some embodiments, the key is based at least in part on an identifier of the remote device or system which sent and/or generated the message. In the case where a vehicle sent the message, the key may be a vehicle identification number (VIN) and the time indicator may be a sequence number. The vehicle or other device may increment the sequence number for each message sent out. Alternatively, in the case where a certain process of a vehicle is associated with the message, the key may be the combination of a VIN and a ProcessID. For example, the vehicle 12 may include an infotainment unit that runs a plurality of processes. The infotainment's operating system kernel may assign process identifiers (ProcessIDs) to each of the processes running thereon. Thus, in one example, when a given process running on the infotainment unit prepares to send data to a server cluster 14, a key-time pair may be generated using the given process's ID and the vehicle's VIN as the key. Here, the generated key-time pair may then be appended to the data that is to be sent, and thus the data and key-time pair comprise a message. In another example, the key of the key-time pair may comprise the vehicle's VIN, the process identifier (ProcessID), and a media access control (MAC) address of the module, such as the MAC address of an infotainment or head module.

In one or more embodiments, the key-time pair may be obtained from the contents of the message and/or may be obtained from processing other information or data in combination with the message. In one example, the message comprises a header and a payload wherein the header and payload are appended to one another. Then, when the message is received, the header may be read into memory and processed separately from the payload. The key-time pair, which may be included in the header, is then obtained from the processing of the header. In a different example, the message may comprise a header including a time indicator and other information, such as a process identifier (ProcessID), a VIN, or one or more MAC addresses. In such an example, the remote server cluster 14 may process the message to generate the key-time pair, which may comprise the ProcessID and a VIN. A computing device or server that is running at time serializer 20, such as input/receiving process 30 or dispatcher 38, may generate the key-time pair.

Figure 3:
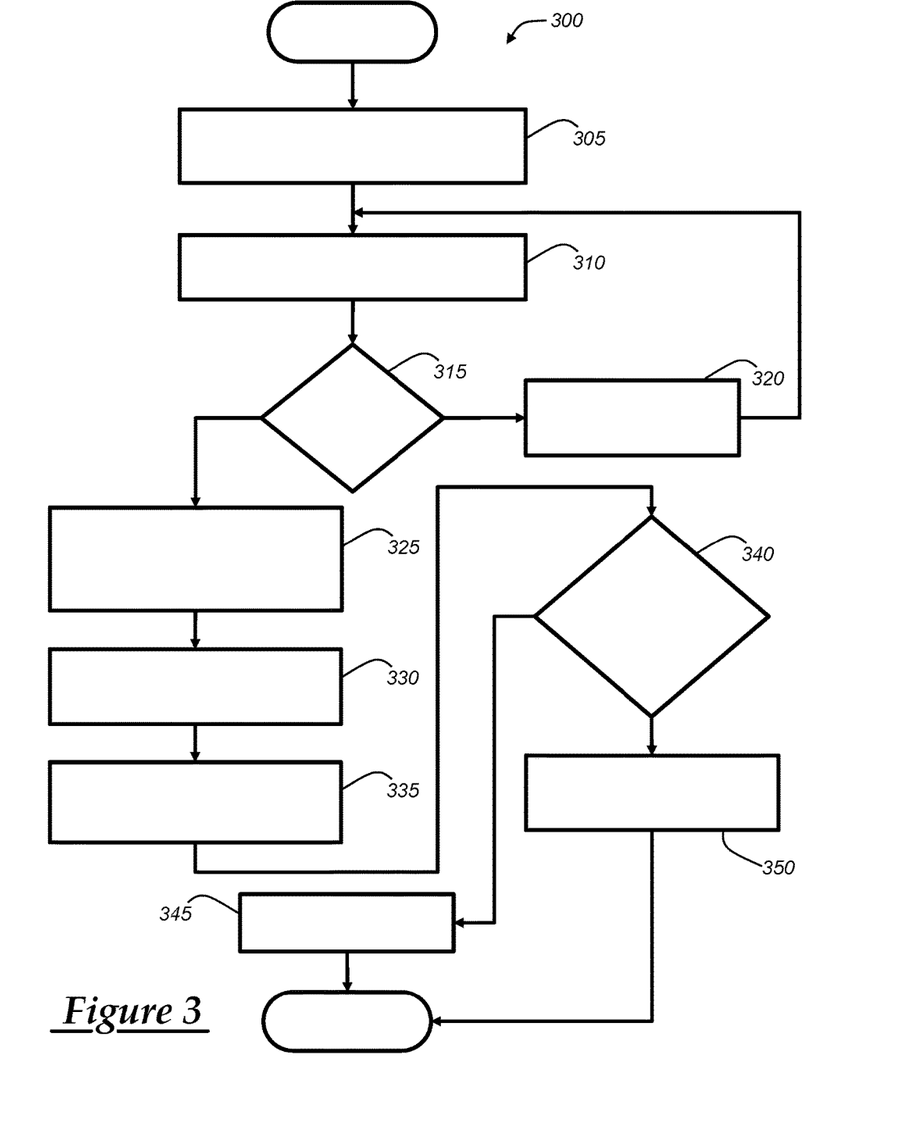
FIG. 3 is a flowchart illustrating a detailed portion of an embodiment of a method for processing a plurality of time-sensitive messages.

In addition to generating a key-time pair, an expiration timer or hold timer may be generated as well. The expiration timer may comprise a timestamp representing the time that the remote server cluster 14 received the message or the time when the key-time pair was generated. This expiration timer may provide additional functionality for the process, as is further described with respect to step 250 and step 320 (FIG. 3). After the key-time pair for the message is generated, the method continues to step 230.

In step 230, the key-time pair is stored in a timer queue. The timer queue is a data structure that stores a plurality of key-time pairs and, in some embodiments, the plurality of key-time pairs may be stored in a chronological order or fashion. The data structure may be any of those known to one skilled in the art or any of those capable of storing a plurality of key-time pairs in a queue, heap, stack, or database table. In some embodiments, the key-time pairs may each have an associated expiration timer or associated value, which, in some embodiments, may be the time indicator itself or may be derived from the time indicator. The timer queue 36 may be kept in RAM and/or may be stored on a non-volatile memory medium. In any case, the key-time pair is added to the timer queue 36. In some embodiments, the timer-queue operates to add the key-time pair into the appropriate position according to the pair's time indicator. The method then proceeds to step 240.

In step 240, the message received in step 210 is stored in a data structure that comprises a priority queue for each key. The received message is stored in the priority queue that corresponds to the key-time pair. For each time-sensitive set of messages, there is a priority queue and, accordingly, each message received can be stored in its corresponding priority queue—one skilled in the art will appreciate that there can be a one-to-one correspondence between the time-sensitive sets of messages and the priority queues. In other embodiments, there may be a one-to-many, a many-to-one, or a many-to-many relationship between the time-sensitive sets of messages and the priority queues. For example, a first vehicle (VIN: 1GNSKJKCZGR9999EX) may comprise two processes, such as one with ProcessID "62" and the other with ProcessID "64" each generating a time-sensitive set of messages, and, thus, the keys for the two sets may be "1GNSKJKCZGR9999EX-62" and "1GNSKJKCZGR9999EX-64," respectively. The first key may correspond to priority queue 34a and the second key may correspond to priority queue 34b. Thus, all messages received from the process 62 of the first vehicle may be stored in the priority queue 34a, which may be identified by the key "1GNSKJKCZGR9999EX-62." In one embodiment, the data structure 32, which comprises the plurality of priority queues 34a-f, may be a hash-map or hash-table that uses a key, such as the one from the generated key-time pair, as an input to a hash function. Provided an inputted key, the hash function may produce an output, which, in some embodiments, may be a pointer to the priority queue corresponding to the inputted key. It should be appreciated that, in other embodiments, step 240 may be carried out in parallel with steps 220 and/or 230. After step 240 is completed, the receiving and storing process 110 then ends.

Message retrieval and computing process 120 may be carried out in parallel with receiving and storing process 110. Process 120, however, may be carried out on a different server than the server which carries out process 110. Process 120 generally contains three steps: obtaining a key-time pair from the timer queue (step 250); recalling a vehicle message from a priority queue that corresponds to the obtained key-time pair (step 260); and processing the recalled message using a compute node (step 270). It should be appreciated that there are numerous potential embodiments for retrieval and computing process 120 and, accordingly, the steps 250 to 270 is but one embodiment. Additionally, steps 305 to 350, which are shown in FIG. 3, comprise an alternative embodiment of the retrieval and computing process 120, which will be discussed below.

In step 250, a key-time pair is obtained from the timer queue. In one embodiment, the dispatcher 38 may obtain the key-time pair upon indication that processing of a previous-recalled message is complete. Then, the dispatcher may query the timer queue 36 for the key-time pair with the oldest time indicator or the oldest time indicator whose associated expiration timer is expired. Or, in another embodiment wherein the time indicator is a sequence number whereby processing is to be carried out in ascending order of the sequence numbers, the dispatcher may query the timer queue 36 for the key-time pair with the lowest sequence number or the lowest sequence number whose associated expiration timer is expired.

In one example, when the next key-time pair includes a sequence number that was one greater than the sequence number of the last message processed for that key (or the next key-time pair corresponds to a first message in a group (e.g., sequence number 1)), then the message corresponding to the next key-time pair may be immediately processed. However, if the next key-time pair has a sequence number that is greater than one more than the sequence number of the last message processed for that same key (next sequence number>(1+last processed message sequence number)), then this may indicate that a message was either lost or has not reached the time serializer yet. In this instance, a timer associated with the next message may be set to include a delay before processing of this next message, thereby allowing some time for the missing or not yet received message to be received at the time serializer such that it may then be processed in the desired time order. In the case of a lost message, the vehicle or the device which sent/generate the messages may realize a message was lost and, in response, the vehicle or device may resend the lost message. In one example, the vehicle or device may be notified by the remote server cluster 14 that a message may have been lost. This notification may include the key, such as a VIN and ProcessID combination, and the missing sequence number.

Upon evaluating the recalled key-time pair, the method continues to step 260. Or, if there is currently a message being processed with the same key or from the same priority queue, then the key is considered "in-flight." In the case where the key is "in-flight," the key-time pair may be re-queued to the back of the timer queue. In this case, step 250 may be repeated to retrieve another key-time pair. Also, when the key-time pair is re-queued, the expiration timer for that key-time pair may be reset or set to a different value such that the key-time pair does not immediately get pulled again from the timer queue.

In step 260, a message is recalled from a corresponding priority queue. The corresponding priority queue corresponds to the key of the obtained key-time pair. In one embodiment, the dispatcher 38 extracts or otherwise obtains the key from the obtained key-time pair and subsequently queries data structure 32 for the priority queue 34a-f that corresponds to the obtained key. Next, the dispatcher 38 may recall the oldest message from the corresponding priority queue. The oldest message may be indicated by the time indicator of the key-time pair or, assuming the priority queue is chronologically ordered by the time indicator, the order of the messages in the priority queue. Alternatively, the dispatcher 38 may recall the message with the same time indicator value. After the message is recalled from the corresponding priority queue, the method continues to step 270.

In step 270, the message is sent to a compute node and then processed by the compute node. In some embodiments, the message may be sent to multiple compute nodes, or the message may be split and certain parts of the message may be sent to multiple compute nodes. One skilled in the art will appreciate there are many different computational methods or procedures that may be used to process the message. In one embodiment, dispatcher 38 sends the message to a compute process or node 50 where the message may be processed. In another embodiment, dispatcher 38 may send a reference or a pointer to the message and, subsequently, the compute process 50 may access the message via the reference or pointer. The compute process 50 may comprise numerous computational processes and may be carried out on one or more servers, processors, and/or computing devices. Moreover, compute process 50 does not necessarily need to be co-located with time serializer 20 at the same server cluster 14 or even at the same facility where the time serializer 20 is located; however, one may appreciate the latency benefits of such a co-located arrangement. The method 200 then ends.

Referring now to FIG. 3, there is shown a detailed portion 300 of an embodiment of a method for processing a plurality of time-sensitive messages. The detailed portion primarily comprises a retrieval and computing process, similar to the process 120 described above with respect to FIG. 2. The steps comprising the detailed portion 300 may be carried out at the same time as those steps 210 to 240 of receiving and storing process 110.

Method 300 begins with step 305, wherein an indication that the processing of a message is complete is received. In one embodiment, a compute process 50 sends an indication that the processing of a message is complete to dispatcher 38. The indication may be a notification that informs dispatcher 38 that processing of a message is complete. The notification may contain the key from the key-time pair that is associated with the message or may contain another key identifying one or more properties, such as the associated remote device or system, of the message whose processing is complete. In other embodiments, the notification may be the message itself and/or a post-processed version of the message. In yet another embodiment, an indication that a compute node is available may be received. After an indication is received, the method 300 continues to step 310.

In step 310, the next key-time pair of the timer queue is examined. In one embodiment, the dispatcher 38 may recall or peek at the next key-time pair of the timer queue 36. The dispatcher 38 accesses the next key-time pair off of the timer queue 36 thereby obtaining the key. As indicated above, the next key-time pair may be the oldest key-time pair based on a timestamp or other time indicator. In some embodiments, the dispatcher 38 queries the timer queue 36 for the oldest or next key-time pair that has an associated expired expiration timer. After a key is obtained, the method 300 continues to step 315.

In step 315, it is determined whether a message with the same key as the key obtained in step 310 is currently being processed. In some embodiments, this step operates to allow only one message from a single time-sensitive set of messages to be processed by a compute node at any given time such that the messages are processed in the correct order. Put differently, processing messages for a single time-sensitive set of messages in a serial, chronological manner helps ensure that messages which are time-sensitive relative to one another are finished processing in the desired order.

In one embodiment of step 315, the dispatcher stores or accesses an in-flight table 37 that may be used to determine which one or more keys correspond to a message that is currently being processed. The in-flight table 37 may be kept in a portion of RAM allocated to dispatcher 38 or may be stored in a non-volatile memory medium accessible by dispatcher 38. The in-flight table may merely comprise a list of keys, wherein the keys in the list each correspond to one or more messages which are currently being processed. Alternatively, the in-flight table 37 may comprise the key-time pairs that correspond to the messages that are currently being processed. In any event, when it is determined that a key is in the in-flight table and/or that a message with the same key as the key obtained in step 310 is currently being processed, then the method continues to step 320. Otherwise, when it is determined that a message with the same key as the key obtained in step 310 is not currently being processed, then the dispatcher 38 may place the key and other appropriate values in the in-flight table 37 and the method 300 then continues to step 325.

In step 320, the key-time pair that was obtained in step 310 is pulled off the timer queue if it has not been done so already and then re-queued in the timer queue. In the event of re-queueing the key-time pair, an associated expiration timer may be reset or otherwise modified or set to a new value. An effect of the expiration timer is that the next key-time pair that is recalled from the timer queue 36 (see step 310) is not the same key-time pair that was re-queued, at least until the expiration timer runs out again. By setting or resetting the expiration time, a certain amount of time must pass before the same key-time pair is obtained again thereby allowing at least the certain amount of time for the message that is currently being processed with the same key to finish processing. The method 300 then continues to step 310 wherein a next key-time pair of the timer queue is examined.

In step 325, the next message in the priority queue that corresponds to the obtained key in step 310 is dispatched to a compute node. In one embodiment, dispatcher 38 queries the data structure 32 for the priority queue that corresponds to the obtained key. The dispatcher then recalls the message and may dispatch the message to a compute process 50. In one embodiment, the dispatcher 38 recalls and sends the entire message to the compute process 50. In another embodiment, the dispatcher 38 sends a reference, such as a pointer or other identifier, to compute process 50, which then recalls the contents of the message itself using the reference. After the message is dispatched, the method 300 continues to step 330.

In step 330, the dispatched message is processed by a compute node. In one embodiment, the message may be a GPS/GNSS message from a vehicle whereby the process 50 operates to correct potential errors in the coordinate values provided in the message. Thus, in this embodiment, a response may be desirable and, therefore, the compute process 50 may generate a response message. In other embodiments, a compute process 50 merely stores the message in a database. In either of these embodiments, or in other embodiments, multiple compute processes, nodes, or servers may operate together to process the dispatched message. Regardless, after the processing of the message is complete, or at least after the processing of the time-sensitive portion of the message is complete, the method continues to step 335. Additionally, post-processing may be carried out by time serializer 20, such as by output process 40. In one embodiment, a response or other message may be generated at remote server cluster 14 and communicated back to the remote device or system, such as vehicle process 62 or 64, via communications system 10.

In step 335, the dispatcher is notified that the processing of the dispatched message is complete. The dispatcher may receive a notification that the processing of the dispatched message is complete. It should be appreciated that this step is the corollary of step 305—the notification sent to the dispatcher here is synonymous with that indication or notification received at step 305. The notification may be the receipt of the dispatched message itself. In another embodiment, the notification may be data and/or information indicating that a message has been successfully processed. It should be appreciated that, upon notifying the dispatcher that the processing of the message is complete, step 305 will then be triggered or otherwise initiated and, thus, the method 300 may be carried out. In any event, after the dispatcher is notified, the method 300 continues to step 340.

In step 340, it is determined whether there is a message in a corresponding priority queue that is ready to be processed. Here, the corresponding priority queue is the queue that corresponds to the key of the message whose processing was recently completed in step 330. The dispatcher 38 may be used to carry out this step by examining the corresponding priority queue and then evaluating the contents thereof to see if there is a message ready to be processed. In one embodiment, a message may be ready for processing if the message's associated expiration timer has expired or, where the time indicator is a timestamp, if the difference between the time indicator and the current time is more than a predetermined amount. The determination of whether a message of the corresponding priority queue is ready to be processed may be carried out in numerous other fashions and based on a plurality of different properties, states, or other indications received at the server cluster 14, time serializer 20, and/or dispatcher 38. The method then continues to step 350 if it has been determined that there is a message in the corresponding priority queue that is ready to be processed; otherwise, the method 300 continues to step 345.

Upon reaching step 345, it has been determined that there are no other messages in the corresponding priority queue that are to be processed at the present time and, therefore, the in-flight table 37 is cleared of the entry or entries for the associated key. Dispatcher 38 may remove this entry or these entries from the in-flight table 37.

Upon reaching step 350, it has been determined that there is a message in the corresponding priority queue that is to be processed and, therefore, the message is dispatched to a compute process. This step is similar in operation to that of step 325 and, thus, may be carried out in a similar fashion. The method 300 then ends.

It is to be understood that the foregoing is a description of one or more embodiments of the invention. For example, the previous two methods (i.e. method 300 and method 400) were described with regard to the specific embodiment of the data network 100 shown in FIG. 2; however, both methods may be carried out by other embodiments of data network 100, such as that which is shown in FIG. 3. Additionally, although a key-time pair is discussed in illustrating certain embodiments of the method, it should be appreciated that a key-time pair is one example of a key n-tuple, and that different key n-tuples may be used in other embodiments. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for processing a plurality of vehicle messages, wherein the method is carried out by a remote server cluster that includes a timer serializer and a plurality of compute nodes, wherein the time serializer includes one or more processors and the plurality of compute nodes are implemented by at least one processor, wherein the method comprises:
receiving a plurality of vehicle messages at the time serializer from a plurality of vehicles;
in response to the receiving step, generating an expiration timer and a key n-tuple including a key and a time indicator for each of the vehicle messages, wherein the generating step is carried out by the time serializer;
storing each of the vehicle messages in a corresponding priority queue of a data structure, wherein the data structure includes a priority queue for each key;
storing each of the expiration timers and the key n-tuple in a timer queue;
obtaining a key n-tuple from the timer queue where the expiration timer associated with the key-time pair is expired;
determining whether at least one vehicle message that is currently being processed by at least one of the plurality of compute nodes has the same key as the key of the obtained key-time pair and, when it is determined that the at least one vehicle message has the same key as the key of the obtained key-time pair, re-queueing the obtained key n-tuple, resetting the expiration timer associated with the key n-tuple to an initial value, and obtaining another key n-tuple from the timer queue;
recalling a vehicle message from a corresponding priority queue; and
sending the vehicle message to at least one of a plurality of compute nodes.

2. The method of claim 1, wherein the key is based at least in part on a unique vehicle identifier associated with a vehicle from which the message was sent.

3. The method of claim 1, wherein the key n-tuple comprises a key-time pair, key-sequence pair, or a key-time-sequence triplet.

4. The method of claim 1, wherein the timer queue stores the key n-tuples chronologically by the time indicators of the key n-tuples.

5. The method of claim 1, wherein the recalled message is selected based on a chronological order.

6. The method of claim 1, further comprising the steps of:
determining that none of the plurality of vehicle messages that are currently being processed by a compute node have the same key as the key of the obtained key-time pair and, based on the determination, removing the key n-tuple from the timer queue.

7. The method of claim 1, further comprising the step of storing a key for the recalled vehicle message in an in-flight data structure.

8. The method of claim 1, further comprising the step of using a lock manager to periodically create a backup at least one of the following: the timer queue, the priority queues, or the in-flight data structure.

9. The method of claim 1, wherein a compute node comprises a set of computer operations, and wherein the plurality of compute nodes are carried out on one or more computing devices that each include a processor.

10. A method for processing a plurality of vehicle messages, wherein the method is carried out by a remote server cluster that includes a timer serializer and a plurality of compute nodes, wherein the time serializer includes one or more processors and the plurality of compute nodes are implemented by at least one processor, wherein the method comprises:
receiving a plurality of vehicle messages at the time serializer from one or more vehicles;
storing a key-time pair including a key and a time indicator for each of the plurality of vehicle messages in a timer queue of the time serializer;
storing each of the vehicle messages in a data structure that includes a priority queue for each key, and wherein each of the vehicle messages are stored in a priority queue that corresponds to the key that was generated for that vehicle message, wherein each of the priority queues are separate from the timer queue;
receiving an indication that a compute node of the plurality of compute nodes is available to process a vehicle message;
recalling a next key-time pair from the timer queue;
determining whether a vehicle message with an associated key identical to the key of the next key-time pair is presently being processed in at least one compute node of the plurality of compute nodes by inspecting an in-flight table that is stored in memory of the remote server cluster, wherein the in-flight table stores one or more keys that correspond to one or more vehicle messages that are currently being processed;
when it is determined that a vehicle message with an associated key identical to the key of the next key-time pair is presently being processed in at least one compute node, re-queueing the next key-time pair in the timer queue and repeating at least the recalling step for another next key-time pair; and
when it is determined that a vehicle message with an associated key identical to the key of the next key-time pair is not presently being processed in at least one compute node, dispatching the oldest vehicle message in the priority queue that corresponds to the key of the next key-time pair to the compute node.

11. The method of claim 10, wherein the key is at least partly based on a unique identifier of the vehicle from which the vehicle message was sent.

12. A method for processing a plurality of messages, wherein the method is carried out by a server cluster that includes a timer serializer and a plurality of compute nodes, wherein the time serializer includes one or more processors and the plurality of compute nodes are implemented by at least one processor, wherein the method comprises:
receiving a plurality of time-sensitive messages from one or more remote devices at the server cluster;
storing a key-time pair including a key and a time indicator for each of the plurality of messages in a timer queue of the time serializer;
grouping messages with identical keys into the same time-sensitive set of messages using the time serializer;
storing each of the messages in a data structure that includes a priority queue for each key, and wherein each of the messages are stored in a priority queue that corresponds to the key that was generated for that message;
receiving an indication that processing of a message has been completed;
recalling a next key-time pair from the timer queue;
determining whether a message with a key identical to the key of the next key-time pair is presently being processed in at least one compute node of the plurality of compute nodes by inspecting an in-flight table that is stored in memory of the server cluster, wherein the in-flight table stores one or more keys that correspond to one or more messages that are currently being processed;
when it is determined that a message with an associated key identical to the key of the next key-time pair is presently being processed in at least one compute node, re-queueing the next key-time pair in the timer queue and repeating at least the recalling step for another next key-time pair; and
when it is determined that a vehicle message with an associated key identical to the key of the next key-time pair is not presently being processed in at least one compute node, dispatching the oldest message in the priority queue that corresponds to the key of the next key-time pair to a compute node of the plurality of compute nodes.

* * * * *